Sept. 21, 1937. A. A. KRAMER 2,093,761
CUSHION MOUNTED BALL AND SOCKET FIFTH WHEEL
Filed Oct. 9, 1935
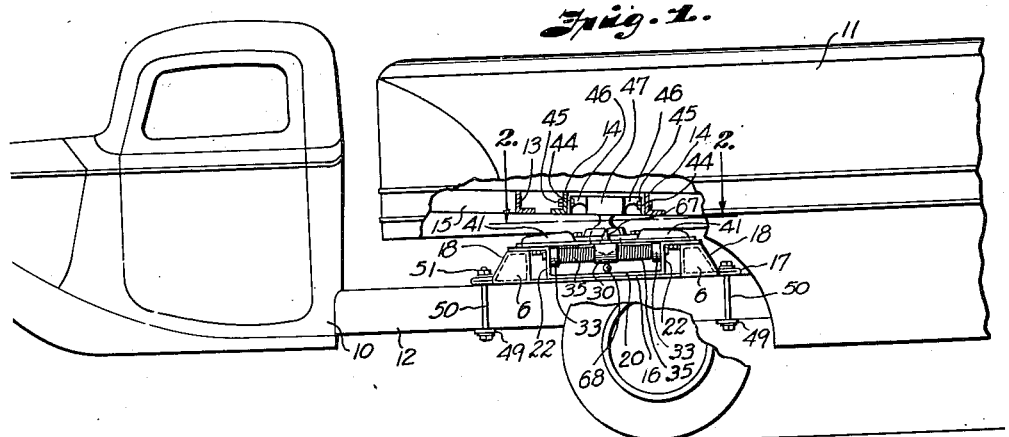
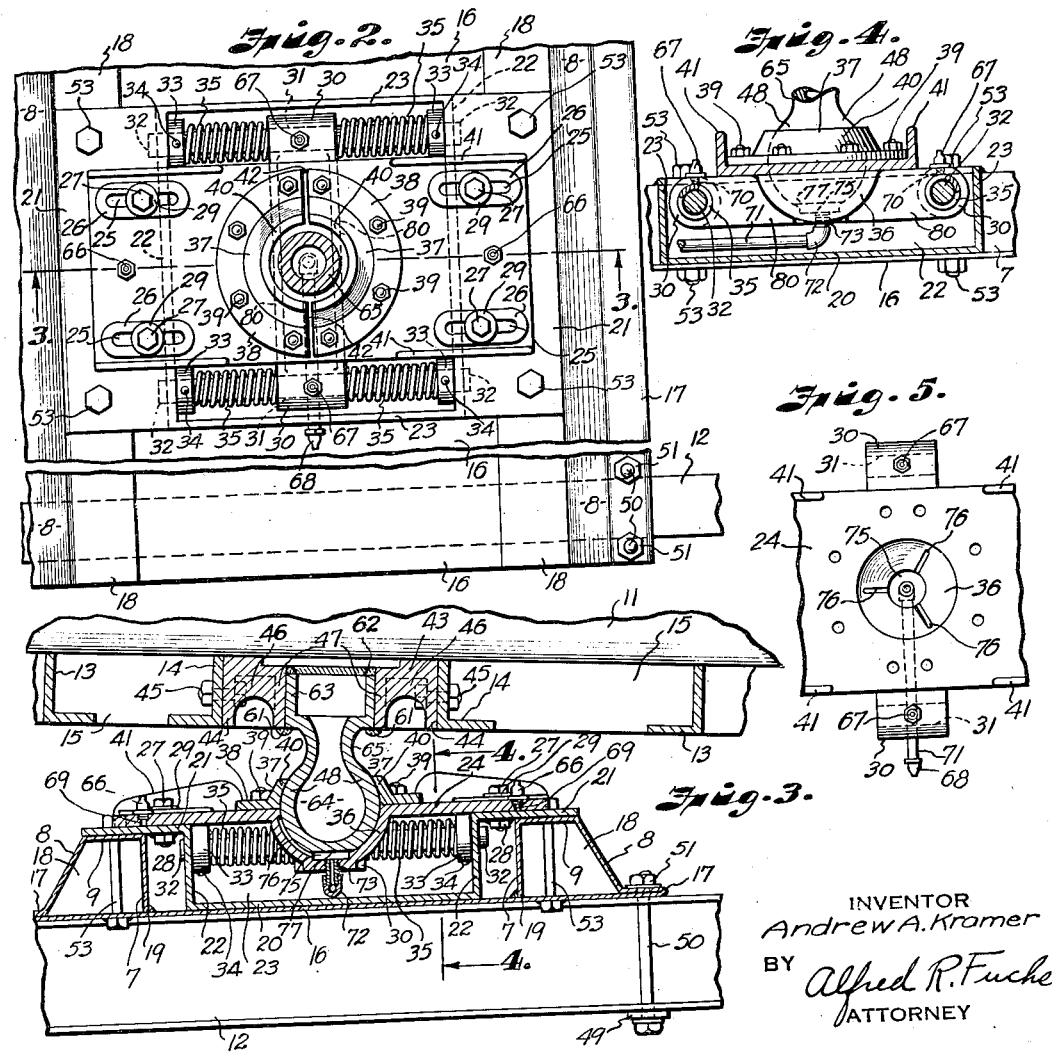
INVENTOR
Andrew A. Kramer
BY Alfred R. Fuchs
ATTORNEY Patented Sept. 21, 1937

2,093,761

UNITED STATES PATENT OFFICE 2,093,761

CUSHION MOUNTED BALL AND SOCKET FIFTH WHEEL

Andrew A. Kramer, Kansas City, Mo.

Application October 9, 1935, Serial No. 44,215

5 Claims. (Cl. 280—33.1)

My invention relates to fifth wheel structures, and more particularly to a cushioned ball and socket fifth wheel structure.

It is a purpose of my invention to provide new and improved means for connecting a tractor, or pulling vehicle, and a trailer together in such a manner that the trailer and the tractor are connected by a universally tiltable connection which is provided with a cushioned mounting to take up the shock of starting and stopping of the vehicle and the application and release of the brakes, or in other words, to take up any shock that might be occasioned by any relative longitudinal movements of the tractor, or pulling vehicle, and the trailer. Said universally tiltable connection is provided in order that the trailer vehicle may have a sidewise rocking motion relative to the pulling vehicle, or may tilt about a substantially transverse axis due to the fact that the trailer vehicle and pulling vehicle wheels are passing over surfaces at different levels, or that a combination of these movements between the trailer and pulling vehicle may take place.

It is a further purpose of my invention to provide a fifth wheel structure of the above mentioned character in which means is provided whereby a certain amount of slack will be provided between the pulling vehicle and the trailer vehicle so as to reduce the effort necessary for starting the combined tractor and trailer vehicles, and to provide means whereby, after the trailer vehicle has been started, it will tend to resume its normal location relative to the pulling vehicle.

It is a further purpose of my invention to provide a fifth wheel structure of the above mentioned character, which comprises a ball member and a socket member that are so mounted relative to each other that they are interlocked, preventing any accidental disengagement of the trailer from the pulling vehicle. However, the socket member is so made that it can be separated to permit the disengagement of the ball member therefrom when this may be desired, and to permit proper fitting of the ball and socket members.

It is another purpose of my invention to provide a ball and socket fifth wheel device in which one of said members is mounted on the pulling vehicle and the other on the trailer, and one of said members is provided with resilient means so related thereto that said resilient means will provide a cushion mounting for said member and buff relative longitudinal movements of the trailer and tractor, or pulling vehicle, relative to each other, whether these be relative movements of the trailer and tractor in a forward or rearward direction.

It is still a further purpose of my invention to provide a ball and socket fifth wheel of the above mentioned character, which is compact so as to not unduly raise the forward end of the trailer above the frame of the tractor, or pulling vehicle, and which is strong and easily attached to the pulling vehicle and which is provided with cushioning means so mounted that the same can be readily replaced, should this become necessary.

It is an important purpose of my invention to provide means for lubricating a cushioned ball and socket fifth wheel mechanism of the above mentioned character.

It is a particular purpose of my invention to provide a ball and socket fifth wheel member, comprising a base member and a member longitudinally slidably mounted for guided movement on said base member, with cushioning means associated with said base member and said slidably mounted member for cushioning relative longitudinal movements of said base member and said member mounted thereon in either direction, and to provide one of the members of a ball and socket connection on said slidably mounted member so as to provide a ball and socket fifth wheel member that is provided with a cushioned mounting on the pulling vehicle.

Other objects and advantages of my invention will appear as the description of the drawings proceeds. I desire to have it understood, however, that I do not intend to limit myself to the particular details shown or described, except as defined in the claims.

In the drawing:

Fig. 1 is a view partly in elevation and partly in vertical section of a fragmentary portion of a tractor and trailer, showing my improved ball and socket fifth wheel associated therewith, said tractor and trailer being partly broken away to more clearly reveal the mounting of the fifth wheel member thereon.

Fig. 2 is a view partly in horizontal section and partly in plan on an enlarged scale, taken substantially on the line 2—2 of Fig. 1.

Fig. 3 is a sectional view taken on the line 3—3 of Fig. 2, fragments of the tractor and trailer being shown associated therewith.

Fig. 4 is a sectional view taken substantially on the line 4—4 of Fig. 3, and

Fig. 5 is a fragmentary plan view of the socket carrying member with the upper socket portion removed.

Referring in detail to the drawing, my improved fifth wheel structure is shown as being applied to any tractor, such as the truck 10, and as connecting with said truck, or tractor, 10 a tank semi-trailer 11. The tractor is, of course, provided with longitudinally extending members 12 forming a portion of the frame thereof, and the trailer is provided with transverse frame members, or bracing members, 13 and 14, these being shown as being angles and being firmly united with the trailer, whether the same be a tank trailer or otherwise, preferably, by being welded thereto and to the longitudinally extending bracing members 15. The tank semi-trailer 11 is shown as being of an offset character and while the invention is particularly advantageous with a drop frame vehicle, or offset vehicle, serving as a trailer, or what is commonly referred to as a "drop frame semi-trailer", the same could be utilized on any semi-trailer.

My improved fifth wheel structure comprises a mounting member 16, which is made up of a plate which has doubled back end flanges 17 and a pair of hollow metallic bolsters, or transverse mounting members, 18, which are formed from the plate 16 by bending the same from the plate and welding the extremity 19 thereof to the body of the plate. The hollow bolsters, or box flanges, 18 are formed from the plate 16 by suitably bending the same after forming the fold or doubled portion 17. Said hollow transversely extending members 18 are provided with inclined walls 8 joining the doubled portions 17 with the flat top walls 9 and the walls 7 thereof extend substantially perpendicularly to the bottom portion of said base or mounting member and to the top walls 9. The doubled portions 17 are integrally welded together to provide a pair of flanges on said member 16 of double strength and thickness. End walls 6 are also welded in said bolsters 18 to close the same and strengthen the same. The mounting member 16 is secured on the frame members 12 by means of the bolts 50 extending on opposite sides of said beams and through openings in the thickened flanges 17 and plates 49, said bolts being provided with nuts 51. While the member 16 is shown as being mounted directly on the frame members 12, it is obvious that suitable blocks can be inserted between the members 12 and 16 to raise the member 16 to a higher point than shown, should this be desirable. The base member 20 has its main body portion resting on the plate 16 and is secured to said plate 16 by means of bolts 53 extending through the hollow bolsters 18 and through the flanges 21 provided on the end walls, or abutments, 22 on said member 20, said flanges 21 engaging the top walls 9 of said bolsters 18. Said base member is also provided with the side flanges 23 providing a box-like chamber, or recess, in the base member 20 between the end walls 22 and side flanges 23.

A socket carrying member 24 is slidably mounted face to face on the member 20 engaging the flanges 21 thereon and is limited in its sliding movements by means of the slots 25 provided in the member 24, said slots being provided with suitable reinforcing ribs 26 around the same. Bolts 27 extend through the slots 25 and are provided with nuts 28 and washers 29, said bolts 27 extending snugly through openings in the flanges 21 so as to be fixed relative thereto, and said nuts being, preferably, welded in position to prevent accidental disengagement thereof. The socket carrying member 24 will thus have limited sliding movement on the base member 20.

Said socket carrying member 24 is provided with a pair of laterally projecting tubular ears 30, which are each provided with a bore, or passage, 31 therethrough in which a rod, or shaft, 32 is slidably mounted. Each rod, or shaft, 32 also extends through an opening in each of the abutments 22 and collars 33 are mounted on said shaft-like members 32 for holding the same in position in the openings, suitable pins 34 being provided for fixing said collars to said shafts. A sort of a cross head arrangement is thus provided for connecting the base member 20 and the socket carrying member 24 through the ears 30 and the shafts, or rods, 32. Coiled compression springs 35 are mounted on the members 32 between the ears 30 and the collars 33 to cushion the movements of the member 24 longitudinally relative to the member 20.

The socket carrying member 24 is provided substantially centrally thereof with a concavo-convex depression 36, the inner surface of which forms a portion of a sphere and forms part of the socket member of the ball and socket connection. The upper portion of the socket member of said ball and socket connection is formed of a pair of socket forming members 37, which are provided with circumferential flanges 38 that are secured in fixed position on the member 28 by suitable headed fastening elements 39, which are shown as being bolts and nuts, although any suitable detachable connection may be provided between said members 37 and the member 24.

Said socket forming members 37 have upwardly and inwardly extending curved flange portions 40, which have their inner faces curved on the surface of a sphere, and which, together with the spherical inner surface of the socket forming portion 36 of the member 24, form the socket of the ball and socket fifth wheel member, said socket having a spheroidal surface which is greater than hemispherical so that the ball member cooperating therewith will be interlocked therewith when assembled therewith. However, the members 37 form the portion of the socket that is in excess of a hemispherical socket so that upon detachment of the members 37 the ball can be detached from the socket member.

The socket carrying member 24 is provided with a plurality of tapering flanges 41 along the opposite side edges thereof extending from the opposite ends toward the longitudinal middle of the member 24, said flanges 41 serving to reinforce said socket carrying member 24. It will be noted that the socket portions 37 are slightly separated from each other, leaving a space at 42. This is desirable for assembly and adjustment purposes. The parts described constitute the lower fifth wheel member, with which an upper fifth wheel member cooperates.

The upper fifth wheel member is mounted on the trailer vehicle by being secured to a pair of cross members 14, said upper fifth wheel member comprising a body portion 43 which is provided with a pair of flanges 44 extending transversely of the trailer vehicle and secured to the members 14 by suitable headed fastening elements, such as the bolts and nuts shown at 45. Suitable reinforcing webs 46 are provided between said flanges and the central substantially rectangular socket portion 47 of said base member. Mounted in the socket portion 47 in fixed position, preferably, by welding both at 61 and 62, is the rectangular hollow body portion 63 of the hollow ball member which terminates in a spherical ball portion 48, the outer spherical surface of the portion 48 being on the same radius of curvature as the inner spherical surface of the socket member formed of the portions 36 and 40, there being such spacing between the ball and socket, however, that the same will be free to swivel or turn in any direction relative to each other so as to provide a universal connection between the pulling vehicle and the trailer vehicle.

The interior of the ball ended member comprising the ball member of the ball and socket fifth wheel may be hollowed out, as indicated at 64, to reduce the weight thereof, although this would depend upon the size thereof and the strength that may be necessary to be provided for said upper fifth wheel member. The neck portion 65 is curved concavely on the exterior thereof so as to join smoothly with the spherical ball end portion on the upper fifth wheel member and is so formed as not to interfere in any way with the movements of the ball and socket connection provided, within the limits that may be desirable for a device of this character.

Means is provided for lubricating the ball and socket fifth wheel member. The lubrication is, preferably, accomplished by means of grease, and fittings are provided at 66, 67 and 68 for connecting some well known form of grease gun with suitable conduits leading to the parts of the device that have to be lubricated. The fittings 66 are provided for the purpose of lubricating the engaging surfaces of the members 20 and 24, and passages 69 are provided through the member 24 for conducting the grease to the engaging surfaces of the members 20 and 24. Passages 70 are provided in the tubular, or sleeve-like members, 30 that lead to the shaft-like members 32 for lubricating the engaging surfaces of the members 30 and 32. The ball and socket themselves are lubricated through the conduit 71 that leads from the fitting 68 and which has an elbow 72 thereon that is provided with a nipple 73 that is threaded into an opening in the bottom of the socket portion 36, the socket portion being somewhat thickened at 74 for this purpose.

A central well, or recess, 75 is provided in the bottom of the socket portion 36 and grooves 76 radiate from said recess, or socket, 75 for distributing the lubricant up along the sides of the socket. The ball member 48 is somewhat flattened at the bottom thereof, as indicated at 77 so as to provide a space in which lubricant can be carried up along the walls of the socket member as the ball member 48 moves through its tilting movements relative to said socket member. Thus lubrication is assured for the entire lower portion of the socket where the major portion of the wear would occur, and lubricant would also be carried up into the upper portion of the socket member due to the movements of the ball member in the socket member. If desired, lubricant could also be applied at the slots 45 and the openings 42 between the two upper halves of the upper socket member, but ordinarily this will not be necessary, as the lubricant will tend to enter the slots 45 and the slots 42 due to the fact that the same has been applied through the fittings under pressure and due to the fact that the parts will be moving back and forth and the lubricant will be carried with the parts as such movement takes place.

It will be noted that the socket carrying member 24 is provided with a pair of reinforcing ribs 80 extending between the tubular ears 30.

What I claim is:—

1. A fifth wheel structure comprising a base member, a member mounted for longitudinal movement on said base member, said base member having a depression therein having end walls, said second member having ears depending into said depression, resilient means mounted between said ears and said end walls to oppose relative longitudinal movements of said members in both directions, a socket on said second member extending into said depression and a member having a ball rigidly mounted thereon mounted in said socket.

2. In a fifth wheel structure, an upper fifth wheel member having a depending ball member thereon, and a lower fifth wheel member comprising a base member having flat top faces thereon and having a depression between said faces, a plate-like member slidably mounted on said base member and engaging said flat top faces thereof, means for guiding the sliding movements of said plate-like member on said base member and a socket member with which said ball member engages on said plate-like member depending therefrom into said depression.

3. In a fifth wheel structure, an upper fifth wheel member having a depending ball member thereon, and a lower fifth wheel member comprising a base member having flat top faces thereon and having a depression between said faces, a plate-like member slidably mounted on said base member and engaging said flat top faces thereof, means for guiding the sliding movements of said plate-like member on said base member and a socket member with which said ball member engages on said plate-like member depending therefrom into said depression, said socket member having laterally projecting ears thereon provided with sleeve-like portions, rod-like members fixed in said base member slidably engaging said sleeve-like portions and resilient members mounted between said sleeve-like portions and said base member, said sleeve-like portions, rod-like members and resilient members being mounted in said depression.

4. In a fifth wheel structure, a lower fifth wheel member comprising a mounting member having a pair of transversely extending hollow metal box-like bolsters and a web portion connecting said bolsters, a base member detachably mounted thereon, said base member having a depressed portion engaging said web and flanges engaging said bolsters, and a socket carrying member detachably slidably mounted on said flanges.

5. In a fifth wheel structure, a lower fifth wheel member comprising a mounting member having a pair of transversely extending hollow metal box-like bolsters having inclined wall portions terminating in outwardly directed flanges and a web portion connecting said bolsters, a base member detachably mounted thereon, said base member having a depressed portion engaging said web and flanges engaging said bolsters, and a socket carrying member detachably slidably mounted on said flanges.

ANDREW A. KRAMER.